(No Model.) 5 Sheets—Sheet 1.

W. B. COULTER.
VALVE GEAR FOR ENGINES.

No. 419,184. Patented Jan. 14, 1890.

Witnesses
Inventor
William B. Coulter
By his Attorney (No Model.) 5 Sheets—Sheet 2.

W. B. COULTER.
VALVE GEAR FOR ENGINES.

No. 419,184. Patented Jan. 14, 1890.

Witnesses
Inventor
William B. Coulter.
By his Attorney (No Model.) 5 Sheets—Sheet 4.

W. B. COULTER.
VALVE GEAR FOR ENGINES.

No. 419,184. Patented Jan. 14, 1890.

Witnesses
E. H. Ottingham
G. F. Downing

Inventor
William B. Coulter.
By his Attorney
H. A. Seymour

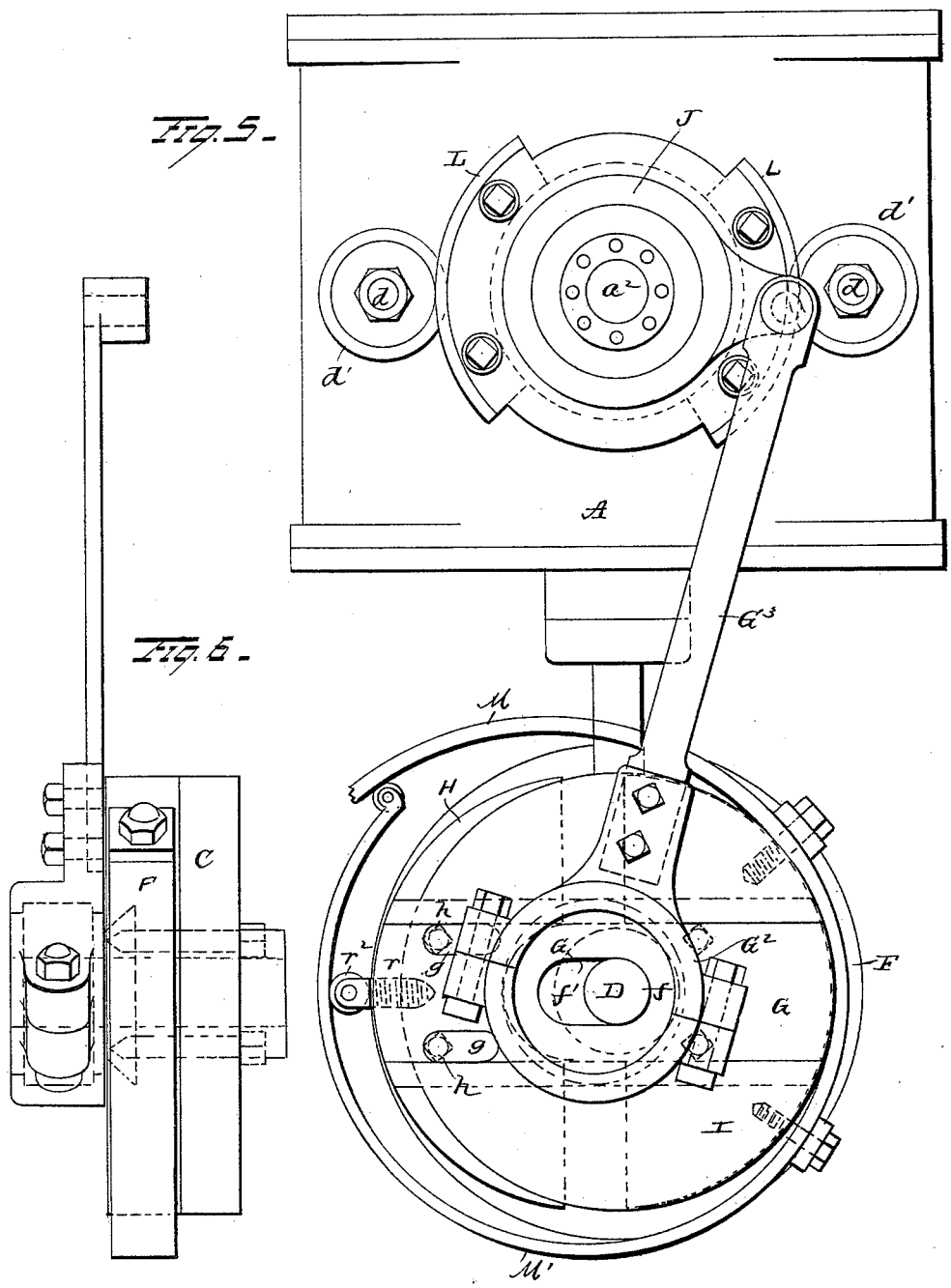

UNITED STATES PATENT OFFICE.

WILLIAM B. COULTER, OF BRISTOL, CONNECTICUT.

VALVE-GEAR FOR ENGINES.

SPECIFICATION forming part of Letters Patent No. 419,184, dated January 14, 1890.

Application filed September 12, 1888. Serial No. 285,234. (No model.)

*To all whom it may concern:*

Be it known that I, WILLIAM B. COULTER, a resident of Bristol, in the county of Hartford and State of Connecticut, have invented certain new and useful Improvements in Valve-Governing Gear for Engines; and I do hereby declare the following to be a full, clear, and exact description of the invention, such as will enable others skilled in the art to which it appertains to make and use the same.

My invention relates to an improvement in valve-gear for engines, and more particularly to a type in which the eccentric is caused to shift its position and change its degrees of eccentricity with regard to the crank-shaft by which it is driven, so as to afford means for the automatic adjustment of the engine-valve to correct variations of speed of the engine due to change of load, strain, or other causes, such devices being technically known as "automatic governors for engines."

The device which is the object of my present invention is adaptable to many forms of steam or other engines; but I give preference in use to an improved form of oscillating engine of my invention patented July 3, 1888, and numbered 385,506, and it will be shown as applied to regulate the speed of such form of engine.

The object of my present invention is to produce an automatic governor for quick-speed engines which shall be of simple form, sensitive in its adjustment, compact in construction, and that is susceptible of adjustment, working reliably under varying pressures of the driving force or abrupt changes in load strain.

With these objects in view my invention consists in the construction of parts and their combinations, as will be hereinafter described, and indicated in the claims.

Figure 1:
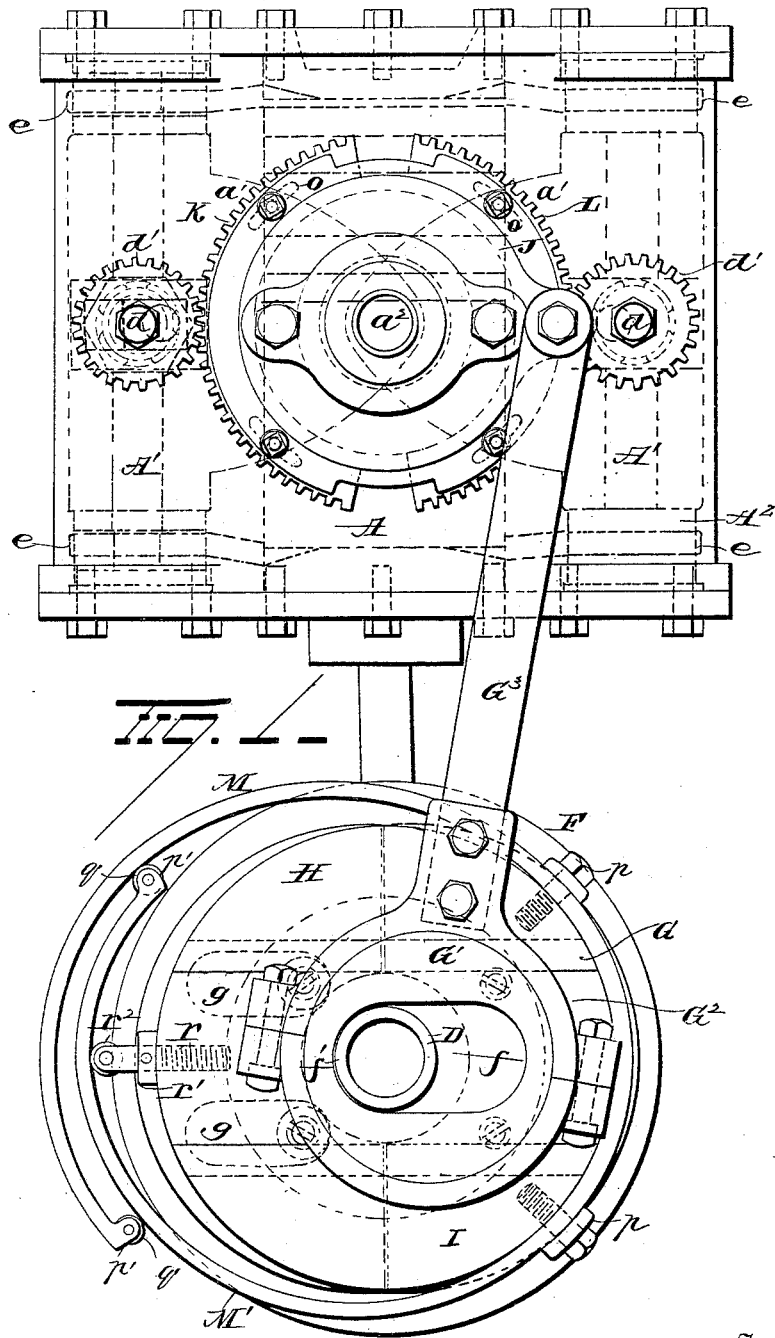
Figure 2:
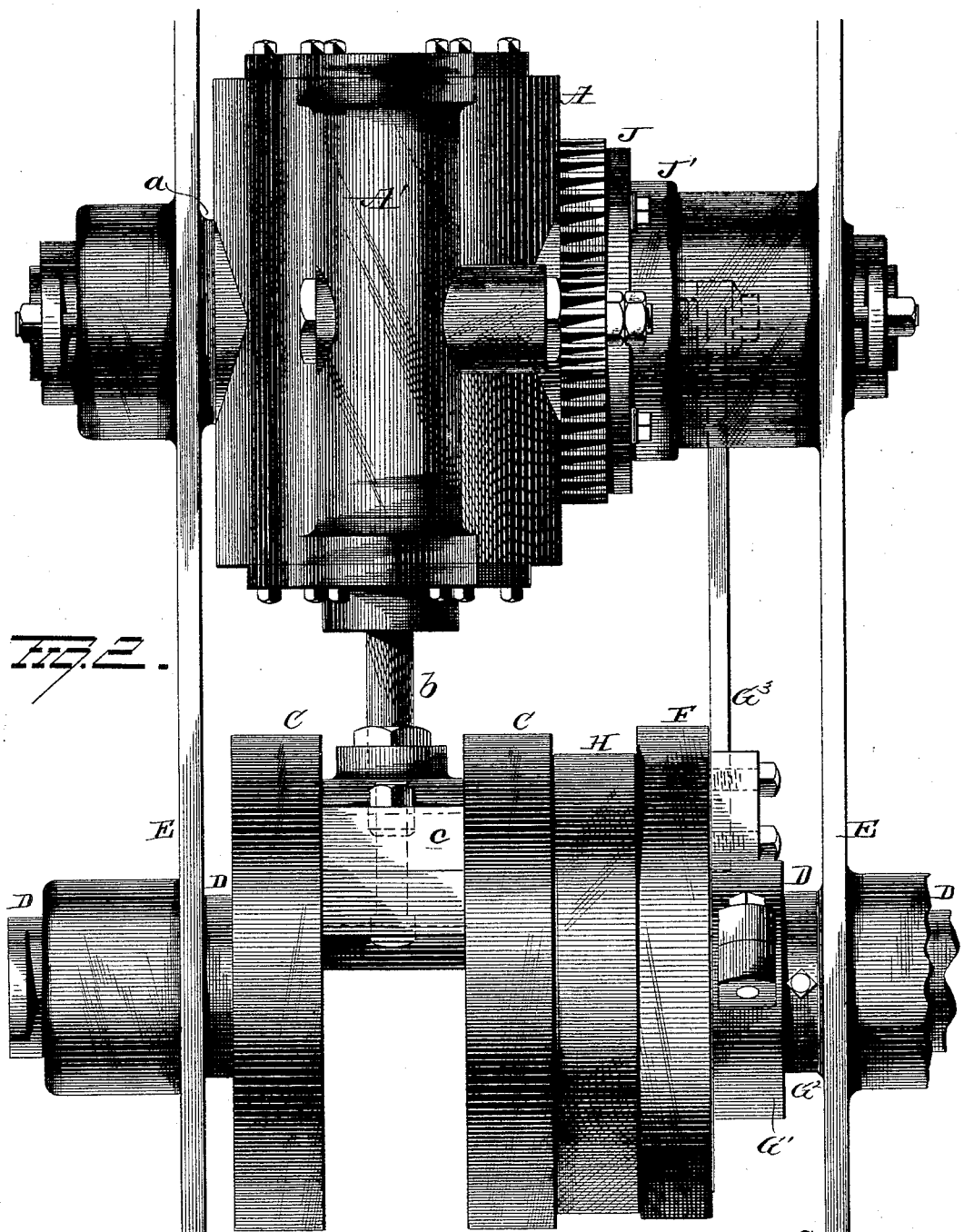
Figure 3:
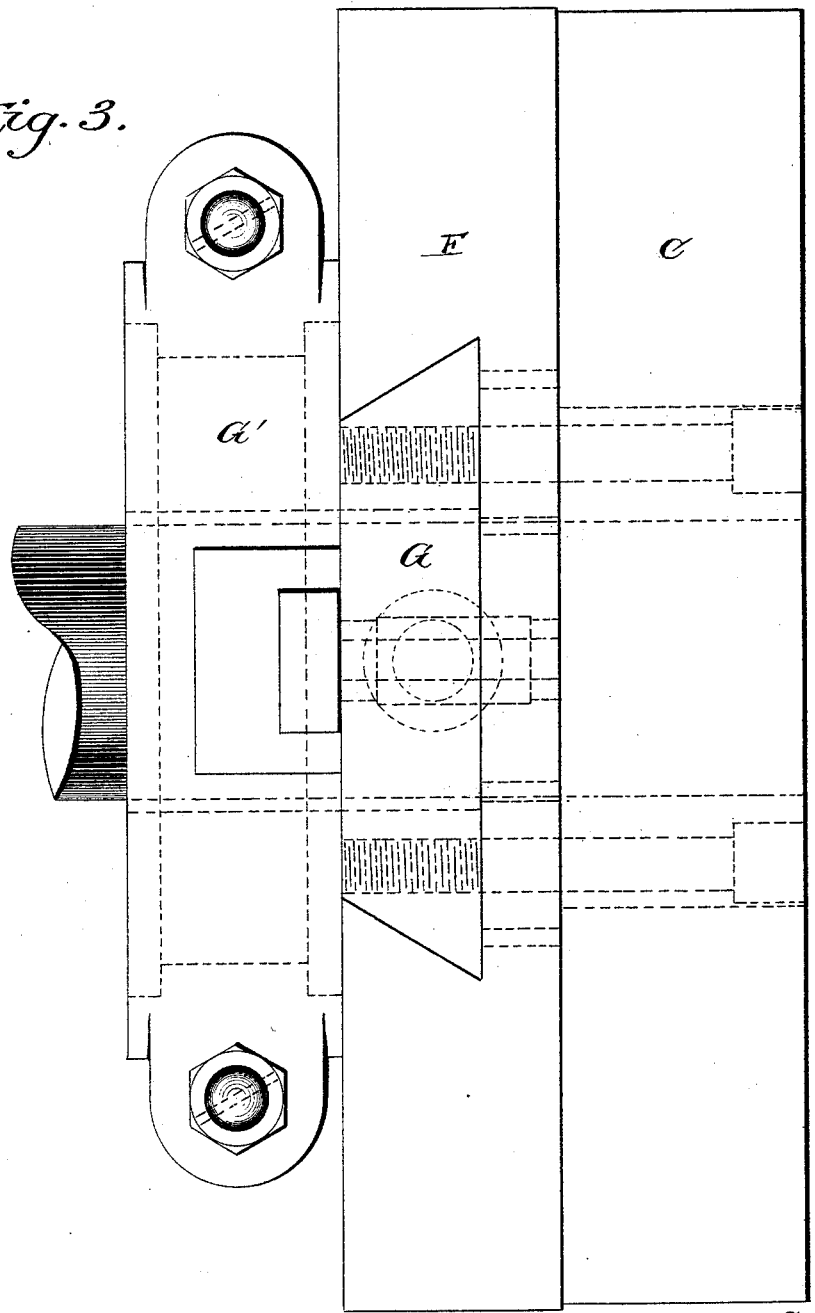
Figure 4:
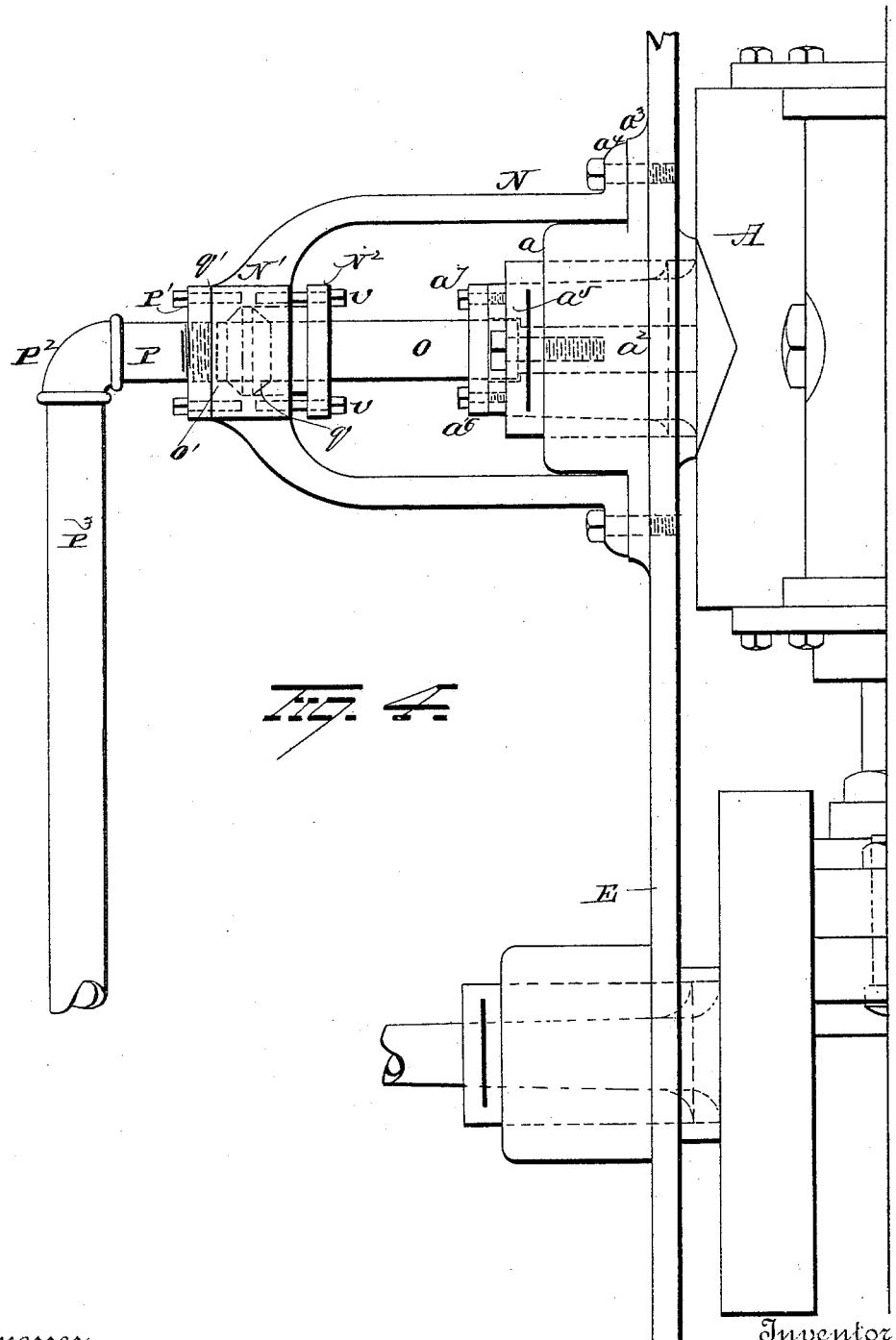

Referring to the drawings, Figure 1 is a side elevation of an oscillating engine with the automatic governor in position. Fig. 2 is a front elevation of the oscillating engine shown in the previous figure with the automatic governor in position. Fig. 3 is a plan view of the eccentric-strap and parts adjacent to it. Fig. 4 is a detail view of steam and exhaust pipe connections with engine-trunnions. Fig. 5 is a view showing the eccentric in a position opposite to that shown in Fig. 1, and Fig. 6 is an edge view of same.

A brief description of the oscillating engine I prefer to use the governor in connection with will now be given, to render the subsequent description of the subject of my present invention more clear and its operation manifest.

A is the engine-cylinder. It is supported on the hollow trunnions $a$, which are fitted to permit oscillation of the cylinder and maintain tight steam-joints with inlet and exhaust pipes, which connect therewith at the ends of the trunnions. The cylinder is fitted with a piston-head B, (shown in dotted lines in Fig. 1,) the rod $b$ of which projects from the lower end of the cylinder a proper distance, to be attached by a suitable box to the common crank-pin $c$ of the duplicate cranks C, which are secured upon or made integral with a driving-shaft D, that is supported to revolve in boxes, which are adjusted on opposite sides of the engine-frame E, that also affords rocking support to the cylinder A.

Upon opposite sides of the cylinder A seats are formed, which are parallel and true on their face. These receive valve-chests A′, which are of the same length as the cylinder and are made integral therewith, or may be secured to the same by bolts, so as to form tight joints. The valve-chests A′ are of equal diameter at each end, and in them are placed cylindrical valves $A^2$, their heads fitting neatly in the bores of the valve-chests. Said chests are enlarged between the inner terminals of the travel of the valves to afford steam-room, and for the same purpose the bodies of the valves $A^2$ are reduced between their heads proper. The steam-cavities produced in the valve-chests are connected to the cylindrical bores $a^2$ of the trunnions $a$ (see Fig. 4) by passages $a'$, which are cored in the wall of the cylinder, so as to connect the live-steam and exhaust pipes with the valve-chests, as shown in Fig. 2, these passages widening from the bores of the trunnions to cut through the adjacent walls of the steam-chests, and thus afford free inlet and outlet conduits for live and exhaust steam. Each valve is given a limited endwise movement by a sliding box-connection near its center with a rock-shaft $d$, which shafts are supported in boxes at right angles to the longitudinal bore of the valve-chests A', and have pinions $d'$ secured to their outer ends, so that a partial rotary movement of the pinions will rock the shafts to which they are attached and reciprocate the valves A' in an obvious manner.

Steam is introduced into and removed from the chests A' by ports $e$, which extend from the ends of the valve-chests to intersect the bore of the cylinder A at each end of the same beyond the travel of the piston-head B.

It is of importance in the operation of the oscillating engine, to which preference is given for the application of my improved valve-governing gear, that is the subject of my present invention, that a proper means be devised for the ready introduction of steam into the valve-chests and its removal therefrom when duty has been performed by it. To effect such an object, I have provided a simple pipe attachment, which is shown in Fig. 4. On the cylinder A the opposite trunnions $a$ project as hubs, having true flat seats $a^3$ formed at their junction with the cylinder. On said seats the bracket-yokes N are bolted by their flanges $a^4$, each bracket extending a proper distance from the cylinder at right angles thereto. The trunnions $a$ are centrally perforated and are counterbored at their outer ends to receive the ends of live-steam and exhaust pipes, respectively. As the attachments of the steam and exhaust pipes are the same, I will limit the description to one connection. The steam-pipe O has its outer end inserted in a stuffing-box $q$, formed in the hub N' of the bracket N, which stuffing-box is axially coincident with the bore of the trunnion $a$, and it will be seen that the terminal end of the pipe O does not quite reach the face $q'$ of the hub N' on bracket N, which will allow the pipe to expand endwise if it is seated in the counterbore of the trunnion $a$. The flange $a^6$ is secured upon the pipe O in such relative position that the set-bolts $a^7$ will hold the end of the pipe seated steam-tight in the counterbore $a^5$, the pipe end being ground to a steam-tight joint with the inner face of this recess or cylindrical cavity. A gland $N^2$ encircles the other end of the pipe O, and by its contact with packing enforced by the bolts $v$ a tight joint is formed around the pipe within the hub N' of the bracket N. The pipe P is threaded on its ends, one of which is inserted in the L $P^2$, to allow its extension $P^3$ to be connected to a steam-generator, the other end having a flange P' in threaded engagement with it, said flange being faced off and held steam-tight against the true end of the hub of the bracket N. The principal advantage of this means of connecting the live-steam and exhaust pipes of an oscillating engine consists in its affording a proper compensation for expansion and contraction of the connected parts, reducing frictional contact of the pipes with the trunnions, and affording a substantial attachment at a moderate cost.

It is evident from the construction given that the introduction of steam through one trunnion will fill the chest in connection with it, and when the cylinder is thrown off its dead-center the valves will, if actuated in proper relation to the cylinder, introduce steam alternately at each end of the same and allow it to exhaust therefrom, causing the piston B to reciprocate, the cylinder to oscillate on its trunnions, and the crank-shaft which is connected to the piston-rod to be rotated at a speed concurrent with the number of vibrations of the cylinder.

The governor-valve gear that is the subject of my present invention will now be described in connection with the oscillating engine and its movement explained. Upon one side of the engine a valve-governing disk F is mounted and secured on the crank-shaft between the adjacent crank-disk C and the inner side of the engine-frame E, said governing-disk F being slotted across its outer face of a proper width and shape on its edges to receive a neatly-fitted dovetail slide-block G, which latter is of a length not quite equal to the diameter of the disk F, in which it is intended to slide endwise. To permit the slide-block G to move freely in its retaining-slot, an elongated orifice $f$ is cut through it, which extends a proper distance each side of the crank-shaft D, over which it is placed, so that it can reciprocate the length of the elongated slot $f$, which determines its proper extreme positions. Upon the outer face of the slide-block G a circular integral projection G', constituting the eccentric, is formed, which is slotted to correspond to the slot of the slide-block, and is eccentric on its periphery with regard to the axis of the crank-shaft D, the degree of eccentricity being sufficient to afford a maximum valve movement, as will be further explained in its order. A sufficient space intervenes between the crank-disk C and the valve-governing disk F to permit a weight H to be inserted and be bolted fast to the slide-block G. Said weight is preferably made semicircular on a portion of its edge and cut away to clear the hub on the valve-governing disk. It is intended that the weight H shall move the slide-block to which it is affixed by centrifugal force, and to render it available for such a purpose there are two elongated slots $g$ cut through the valve-governing disk F, parallel to each other and at suitable points to permit the bolts $h$, which secure the weight fast to the slide-block, to penetrate through these slots and slide freely in them when the weight H and slide-block G are moved. A counterbalance weight I is provided of similar form to that of the weight H, said weight I being fastened to the valve-governing disk F at such a point opposite to the weight H that when the rounded edges of these weights are concentric with the crank-shaft D they will balance each other. On the hub of the engine-frame, that is located preferably in the same vertical plane with the crank-shaft D above it, a gear-supporting plate J is loosely mounted by engagement of its hub J' therewith, this plate being circular on its edge and located on the same side of the cylinder as the eccentric G' below it. An eccentric-strap G² is placed on the eccentric G', and a vertically-extended rod G³ connects said strap with the gear-plate J, so that the reciprocal movement of the rod G³ will rock the gear-plate, and it is evident that the degree of rocking movement communicated by the rod to the plate will depend on the throw of the eccentric, so that an alteration of the latter will increase or diminish the range of oscillation of the gear-plate. It will be borne in mind that the rock-shafts d, which are intended to move the valves A² endwise, and thus alternately uncover the steam and exhaust ports at each end of the cylinder A, are provided with toothed pinions d'. Now the relative position of these pinions on opposite sides of the trunnions a is such that the pinion which is adapted to slide the live-steam valve will have meshed engagement with a toothed segment K, that is adjustably secured to the bracket-plate J, concentric with its hub, and the other pinion that actuates the exhaust-valve will engage a similarly-formed toothed segment L, the arched segments L and K being preferably made of equal radius extending from the center of the trunnion. Both of the curved segments K and L are provided with curved elongated slots, which are parallel to the peripheral toothed edges of the segments, so that they may be shifted on the securing-bolts o, that clamp them adjustably upon the side of the bracket-plate J. It is apparent that by the provision of adjustment mentioned the toothed segments K L may be caused to actuate the valves farther toward each end of the valve-chest, as may be desired, to regulate the proper adjustment of the valves. In order to render the weight H operative, the curved plate-springs M M' are provided. These are secured by the bolts p to the edge surface of the governing-disk F, the degree of curvature of the plates allowing the portion of their bodies near their ends p' to hang below the periphery of the disk F, and permit the free ends p' to lap a suitable distance. The two anti-friction rollers q are pivoted in bracket-ears on the ends of the plate-springs M M', so as to have rolling contact with the adjacent surface of the springs, and thus allow the springs to move endwise on each other with slight frictional resistance. From the center of width of the slide-block G, at its lower end, a screw-threaded stud r is projected toward the springs M, said stud being adjustably secured in the end of the slide-block. The free end of the stud r is furnished with an anti-friction roller r², suitably mounted to rotate freely, which roller is made to have bearing contact with the inner surface of the springs M', a jam-nut r', that is placed on the stud r, affording means for critical adjustment of the tension of the springs by surface contact of the roller on the end of the stud r therewith, to counteract the gravity of the weight H, and a portion of its centrifugal force developed by rotation of the crank-shaft D.

In operation, the engine being furnished with steam or other fluid having driving force, the cylinder will be oscillated by the reciprocal movement of the piston B, which will revolve the crank-shaft D.

To illustrate the operation of the valve-gear mechanism, let it be assumed that the crank-pin c is on the upper center. The governor-eccentric G' must be so adjusted as to occupy the position shown in Fig. 1, or projected laterally toward the right side of the engine, which will locate the elongated slot f in nearly a horizontal plane, with one terminal edge f' in contact with the shaft-body on the left side, thus limiting the outward projection of the eccentric-block. When the shaft D is moved, the eccentric G' will revolubly move the gear-supporting bracket-plate J downwardly on the right side of the engine, while the oscillation of the cylinder A will carry the pinion-gears in an opposite direction and cause them to revolve by their engagement with the toothed segments K L, and thus throw the live-steam and exhaust valves to open fully the ports they cover by their reciprocal movement. As the engine increases its speed, the centrifugal force of the sliding weight H will cause the eccentric G' and its supporting slide-block G to move and draw the eccentric toward the center of the shaft D. When this point is reached, the block G' will have its peripheral edge held coincident with the shaft-center, and no movement will be communicated to the gear-plate J. The valves will now be actuated solely by the oscillation of the cylinder, and consequently will be moved but one-half the distance endwise, so that the ports will be opened one-half their full dimensions. Should the speed still increase from diminished load strain or higher initial steam-pressure furnished by the boiler, the momentum of the weight H will carry the governing-eccentric G past the center or toward the left side of the engine-shaft. This will cause the eccentric G' to rock the gear-plate in the same direction as the cylinder oscillates, which will still further reduce the reciprocal motion of the valves. Should speed suddenly slacken from increase of load strain or other cause, the resilience of the springs M M' will counteract the force of the weight H and throw the eccentric G' in an opposite direction, which will render it available to proportionately increase the throw of the valves, and consequently accelerate the motion of the engine. Any further increase of speed will cause the weight to be moved by centrifugal force, which will correct this variation from normal speed in the manner hereinbefore explained. It will thus be apparent that any change in the load of the engine or increase in steam-pressure will be instantly and automatically corrected by the operation of my improved governing-gear.

It is feasible to secure the gear-segment which operates the exhaust-valve fast to the frame of the engine, so that it will not be effected by the eccentric, said gear-segment being held independent of the bracket-plate J, so that the rolling of the valve-operating pinion will always throw the exhaust-valve full-stroke, and thus open the exhaust-port its maximum capacity to discharge steam without regard to the movement of the live-steam valve, which is controlled by the governing-gear, as hereinbefore described.

From the foregoing description it will be seen that the action of my improved automatic governor will be reliable within its range, and that it may be adjusted by the alteration of a single bolt to sensitize the same and render it capable to operate efficiently under varying conditions of the load strain or steam-pressure.

If preferred, a single plate-spring M may be employed in lieu of the pair of springs hereinbefore described, and it will work equally well if of a proper strength and resilience.

By slight changes of connection of the eccentric-rod with other styles of valves the automatic governor device herein described may be readily adapted to regulate the speed of the other types of quick-speed engines, vertical or horizontal. Hence I do not desire to limit its application to the engine herein shown and described; but, Having fully described my invention, what I claim as new, and desire to secure by Letters Patent, is—

1. The combination, with a main crank-shaft, a valve-governing disk fixed on this shaft, and a slide-block having an eccentric projection, of a weight secured to the slide-block, a counterbalance-weight, and a device to adjustably counteract the gravity and centrifugal force of the weight attached to the slide-block, substantially as set forth.

2. The combination, with a main crank-shaft and a valve-governing disk fixed on this shaft and slotted across its face, of a slide-block, a weight attached to said slide-block, a counterbalance-weight fastened to the valve-governing disk, an eccentric, an eccentric-strap, and a rod to connect the eccentric-strap with an engine steam-valve, to regulate its movements, substantially as set forth.

3. The combination, with a valve-governing disk, a slide-block having an eccentric which is adapted to reciprocate on the face of the valve-governing disk, and a weight attached to the slide-block, of a counterbalance-weight and an adjustable spring device adapted to counteract against the gravity and centrifugal force of the weight attached to the eccentric slide-block, substantially as set forth.

4. The combination, with an engine-shaft, a valve-governing disk, a slide-block carrying an eccentric hub which is held in engagement with and slides across the face of the valve-governing disk, and an eccentric-strap with its attached rod, of a plate-spring and an adjusting-screw adapted to regulate the tension of this plate-spring, substantially as set forth.

5 The combination, with an engine-shaft, a valve-governing disk, a slide-block, an eccentric-block integral with this slide-block and made to slide across the face of the valve-governing disk by the coaction of a weight and a plate-spring, and a weight that is secured upon and slides with the slide-block, of a counterbalance-weight secured to the valve-governing disk opposite to the other weight, and a plate-spring, substantially as set forth.

6. The combination, with a main shaft, a valve-governing disk fixed on this shaft, a slide-block and an eccentric-block, both being held to slide in a slot formed in the body of the governor-disk, a weight attached to the slide-block, an eccentric-strap, and an eccentric-rod, of a counterbalance-weight attached to the valve-governing disk, two plate-springs, and an adjusting-screw which regulates the tension of the plate-springs and connects them to the sliding weight to counteract against its gravity and centrifugal force, substantially as set forth.

7. The combination, with an engine main shaft, a valve-governing disk fixed on this shaft, a slide-block having an eccentric thereon, a weight attached to the slide-block, an eccentric-strap, and an eccentric-rod, of a counterbalance-weight attached to the valve-governing disk, two curved plate-springs secured to the valve-governing disk and having their ends free to move on each other, anti-friction rollers mounted on the free ends of the plate-springs, and an adjustable stud provided with an anti-friction roller which engages the adjacent surface of one of the plate-springs, substantially as set forth.

8. The combination, with an oscillating engine-shaft, a valve-governing disk fixed thereon, a slide block, an eccentric-block integral with the slide-block, and a weight attached to the slide-block for moving it by centrifugal force, of a counterbalance-weight, two plate-springs secured to the valve-governing disk, an adjusting-stud that transmits the tension of the springs to the end of the slide-block, an eccentric-strap, a rod, and valve mechanism regulated by the enforced action of the eccentric-strap and its rod, substantially as set forth.

9. The combination, with an oscillating engine-shaft, a valve-governing disk fixed on this shaft, a sliding eccentric-block, a weight secured thereto, a counterbalance-weight, and a spring to counteract the gravity and centrifugal force of the sliding weight, of a live-steam valve, a rock-shaft, a pinion, a gear-segment, an eccentric-strap mounted on the eccentric-block, and a rod to connect the gear-segment with the eccentric-strap, substantially as set forth.

10. The combination, with a shaft, a valve-governing disk fixed thereon, a slide-block bearing an eccentric-block, a weight attached to the side of the slide-block so as to slide with it, a counterbalance-weight attached to the valve-governing disk, a pair of curved plate-springs, an adjustable stud, an eccentric-strap, and an eccentric-rod, of a live-steam valve, a rock-shaft, a pinion, and a gear-segment meshed with the rock-shaft pinion and loosely mounted to be rocked by the eccentric, which is connected to it through the eccentric strap and rod, substantially as set forth.

11. The combination, with an oscillating engine-shaft, a valve governing disk fixed on this shaft having a slot on its face, a slide-block, an eccentric-block made integral with this slide-block, a weight attached to the slide-block, a mating counterbalance-weight attached to the valve-governing disk, a pair of curved plate-springs secured by their ends to the governor-disk and adapted to press on an adjustable stud that projects from the end of the slide-block, and an eccentric strap or rod, of an oscillating cylinder supported on a frame, a live-steam valve, a mating exhaust-valve, a rock-shaft to move these valves endwise, pinions on the ends of the rock-shafts, a rocking gear-segment for the live-steam valve, and a rocking gear-segment for the exhaust-valve, these rocking segments being connected to the eccentric-block to receive motion from it through the eccentric strap and rod, substantially as set forth.

In testimony whereof I have signed this specification in the presence of two subscribing witnesses.

WILLIAM B. COULTER.

Witnesses:
CHARLES DERBY,
NELSON FRASER.